US012630897B2

(12) United States Patent  (10) Patent No.: US 12,630,897 B2
Cobo et al.  (45) Date of Patent: May 19, 2026

(54) METHOD FOR PRODUCING HIGH-STRENGTH STEEL PARTS WITH IMPROVED DUCTILITY, AND PARTS OBTAINED BY SAID METHOD

(71) Applicant: ArcelorMittal, Luxembourg (LU)

(72) Inventors: Sebastian Cobo, Ancy-sur-Moselle (FR); Christian Allely, Metz (FR); Martin Beauvais, Marange Silvange (FR); Anis Aouafi, Fèves (FR); Emmanuel Lucas, Metz (FR)

(73) Assignee: ArcelorMittal, Luxembourg (LU)

( * ) Notice: Subject to any disclaimer, the term of this patent is extended or adjusted under 35 U.S.C. 154(b) by 96 days.

(21) Appl. No.: 18/625,591

(22) Filed: Apr. 3, 2024

(65) Prior Publication Data

US 2024/0254586 A1  Aug. 1, 2024

Related U.S. Application Data

(62) Division of application No. 17/943,561, filed on Sep. 13, 2022, now Pat. No. 11,976,342, which is a
(Continued)

(30) Foreign Application Priority Data

Jun. 1, 2017  (WO) ................. PCT/IB2017/000677

(51) Int. Cl.
| *C21D 9/48* | (2006.01) |
| *B32B 15/01* | (2006.01) |
| *C21D 1/673* | (2006.01) |
| *C21D 6/00* | (2006.01) |
| *C21D 8/02* | (2006.01) |
| *C21D 8/0221* | (2026.01) |
| *C21D 8/0247* | (2026.01) |
| *C22C 38/00* | (2006.01) |
| *C22C 38/02* | (2006.01) |
| *C22C 38/04* | (2006.01) |
| *C22C 38/06* | (2006.01) |
| *C22C 38/44* | (2006.01) |
| *C22C 38/48* | (2006.01) |
| *C22C 38/50* | (2006.01) |
| *C22C 38/54* | (2006.01) |
| *C23C 2/02* | (2006.01) |
| *C23C 2/06* | (2006.01) |
| *C23C 2/12* | (2006.01) |
(Continued)

(52) U.S. Cl.
CPC .............. *C21D 9/48* (2013.01); *B32B 15/012* (2013.01); *B32B 15/013* (2013.01); *C21D 1/673* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/001*

(2013.01); *C22C 38/004* (2013.01); *C22C 38/02* (2013.01); *C22C 38/04* (2013.01); *C22C 38/06* (2013.01); *C22C 38/44* (2013.01); *C22C 38/48* (2013.01); *C22C 38/50* (2013.01); *C22C 38/54* (2013.01); *C23C 2/02* (2013.01); *C23C 2/022* (2022.08); *C23C 2/024* (2022.08); *C23C 2/06* (2013.01); *C23C 2/12* (2013.01); *C23C 2/28* (2013.01); *C23C 2/40* (2013.01); *C21D 2211/002* (2013.01); *C21D 2211/008* (2013.01)

(58) Field of Classification Search
None
See application file for complete search history.

(56) References Cited

U.S. PATENT DOCUMENTS

| 5,785,924 A | 7/1998 | Beguinot et al. |
| 2006/0278309 A1 | 12/2006 | Bouzekri et al. |
(Continued)

FOREIGN PATENT DOCUMENTS

| CN | 1174244 A | 2/1998 |
| CN | 1846002 A | 11/2006 |
(Continued)

OTHER PUBLICATIONS

"Steel Melt Processing," ASM Handbook, vol. 15, 2008.
"Sekundärmetallurgie," Wikipedia article Dec. 18, 2015 last downloaded from,,https://de.wikipedia.org/w/index.php?title=Sekundärmetallurgie&oldid=149166104 on Mar. 8, 2022, see machine translation.
(Continued)

*Primary Examiner* — Jenny R Wu
(74) *Attorney, Agent, or Firm* — Davidson Kappel LLC

(57) ABSTRACT

A method for manufacture of a hot-rolled steel sheet which includes: producing a liquid steel to which manganese, silicon, niobium, and chromium are added, the additions being made in a vacuum chamber, then desulfurizing the liquid metal without increasing its nitrogen content, then adding titanium, said additions being made so as to obtain a liquid metal having a chemical composition where the titanium and nitrogen contents satisfy: Ti/N>3.42, and the carbon, manganese, chromium, and silicon contents satisfy: 2.6C+Mn/5.3+Cr/13+Si/15>=1.1%, then casting a semi-finished product, then heating said semi-finished product to a temperature between 1250° C. and 1300° C. for a holding period at this temperature between 20 minutes and 45 minutes, then hot rolling said semi-finished product to a rolling end temperature TFL between 825° C. and 950° C., to obtain a hot-rolled sheet, then coiling said hot-rolled sheet at a temperature between 500° C. and 750° C. to obtain a hot-rolled and coiled sheet, then pickling the oxide layer formed in the previous steps.

14 Claims, 2 Drawing Sheets

Related U.S. Application Data division of application No. 16/617,903, filed as application No. PCT/IB2018/053832 on May 30, 2018, now Pat. No. 11,473,166.

(51) Int. Cl.
  C23C 2/28     (2006.01)
  C23C 2/40     (2006.01)

(56)              References Cited

U.S. PATENT DOCUMENTS

| | | | |
|---|---|---|---|
| 2008/0035248 A1 | 2/2008 | Cugy et al. | |
| 2010/0106025 A1 | 4/2010 | Sarfaty et al. | |
| 2010/0139821 A1 | 6/2010 | Giefers et al. | |
| 2011/0182765 A1 | 7/2011 | Giefers et al. | |
| 2012/0031528 A1 | 2/2012 | Hayasaki et al. | |
| 2012/0211128 A1 | 8/2012 | Corguillet et al. | |
| 2013/0037180 A1 | 2/2013 | Sano et al. | |
| 2013/0295402 A1 | 11/2013 | Oh et al. | |
| 2013/0340899 A1 | 12/2013 | Kusumi et al. | |
| 2014/0246128 A1 | 9/2014 | Takashima et al. | |
| 2014/0377582 A1 | 12/2014 | Azuma et al. | |
| 2015/0024237 A1 | 1/2015 | Hiroyuki et al. | |
| 2015/0050519 A1 | 2/2015 | Nonaka et al. | |
| 2016/0017452 A1 | 1/2016 | Velasquez et al. | |
| 2016/0160309 A1 | 6/2016 | Allain et al. | |
| 2016/0208352 A1 | 7/2016 | Suikkanen et al. | |
| 2017/0253941 A1 | 9/2017 | Cobo | |
| 2017/0298465 A1* | 10/2017 | Cobo | C22C 38/44 |
| 2020/0157666 A1 | 5/2020 | Sakakibara et al. | |

FOREIGN PATENT DOCUMENTS

| | | | | | |
|---|---|---|---|---|---|
| CN | 101090982 | A | 12/2007 | | |
| CN | 103392022 | A | 11/2013 | | |
| CN | 103842539 | A | 4/2014 | | |
| CN | 104769138 | A | 8/2015 | | |
| CN | 105408503 | A | 3/2016 | | |
| CN | 106222556 | | 12/2016 | | |
| EP | 2708610 | A1 | 3/2014 | | |
| JP | 61073818 | A * | 4/1986 | .............. | C21C 7/10 |
| JP | H06316729 | A | 11/1994 | | |
| JP | 2004068050 | A | 4/2004 | | |
| JP | 2004068051 | A | 4/2004 | | |
| JP | 2007211279 | A | 8/2007 | | |
| JP | 2013076148 | A | 4/2013 | | |
| JP | 6103165 | B1 | 3/2017 | | |
| KR | 20130075926 | A | 8/2013 | | |
| KR | 20160077583 | A | 4/2016 | | |
| RU | 2403291 | C2 | 11/2010 | | |
| RU | 2485202 | C1 | 6/2013 | | |
| RU | 2587106 | C2 | 6/2016 | | |
| UA | 28779 | | 10/2000 | | |
| WO | WO2011104443 | A1 | 1/2011 | | |
| WO | WO 2012120692 | A1 | 9/2012 | | |
| WO | WO-2016016707 | A1 * | 2/2016 | ........... | C21D 8/0236 |
| WO | WO 2017006159 | | 1/2017 | | |

OTHER PUBLICATIONS

"Refining Outside the Furnace", Li Maowang et al. Metallurgical Industry Press, p. 175; Feb. 2016; see machine translation.

See International Search Report of PCT/IB2018/054413, dated Oct. 10, 2018.

Secondary metallurgy, Wikipedia Article last downloaded on Dec. 9, 2021; https://de.wikipedia.org/w/index.php?title=Sekundärmetallurgie &oldid=149166104#cite_note-werkstofftechnik-1.

Wendy-Julie Madore, Etienne De Montigny, Olivier Ouellette, Simon Lemire-Renaud, Mikael Leduc, Xavier Daxhelet, Nicolas Godbout, and Caroline Boudoux, "Asymmetric double-clad fiber couplers for endoscopy," Opt. Lett. 38, 4514-4517 (2013).

* cited by examiner $$Y = -6,75 (X-40)$$

METHOD FOR PRODUCING HIGH-STRENGTH STEEL PARTS WITH IMPROVED DUCTILITY, AND PARTS OBTAINED BY SAID METHOD

This application is a divisional of U.S. application Ser. No. 17/943,561, filed Sep. 13, 2022, published as U.S. 2023/0019292 A1, which is a divisional of U.S. application Ser. No. 16/617,903, filed Nov. 27, 2019, now patented as U.S. Pat. No. 11,473,166 B1, which is a 371 Application of PCT/IB2018/053832, filed May 30, 2018, published as WO 2018/220540 A1, which claims priority to PCT/IB2017/000677, filed Jun. 1, 2017, published as WO 2018/220412 A1, the entire disclosures of which are hereby incorporated by reference.

The invention relates to steel sheets designed to obtain parts with very high mechanical strength after press hardening. Press hardening is known to involve heating steel blanks to a temperature sufficient to obtain austenitic transformation, then hot stamping the blanks by holding them in the press tool to obtain quenching microstructures. According to a variant of the process, cold pre-stamping can be performed beforehand on the blanks before heating and press hardening. These blanks can be precoated, for example with aluminum or zinc alloys. In this case, during heating in a furnace, the precoating is combined by diffusion with the steel substrate to form a compound that protects the surface of the part against decarburization and scale formation. This compound is suitable for hot forming.

BACKGROUND

The parts thus obtained are used as structural elements in motor vehicles to provide anti-intrusion or energy absorption functions. Examples of applications include bumper crossmembers, door or middle pillar reinforcements or side rails. Such press-hardened parts can also be used, for example, in the manufacture of tools or parts for agricultural machinery.

Requirements for reducing motor vehicle fuel consumption are driving efforts for even greater vehicle weight reduction using parts with an even higher level of mechanical strength, in other words, with a strength Rm greater than 1800 MPa. However, such a level of resistance is generally associated with a microstructure that is totally or almost completely martensitic. It is known that this type of microstructure has a lower resistance to delayed cracking: after press hardening, the manufactured parts may indeed be likely to crack or to fracture after a certain amount of time.

Publication WO2016016707 discloses a method for the manufacture of parts and a rolled steel sheet for press hardening that results simultaneously in a very high mechanical strength Rm greater than or equal to 1800 MPa, a high resistance to delayed cracking after press hardening, and a wide range of thickness in cold-rolled sheets. To achieve this, the nickel content of the chemical composition of the sheet is between 0.25% and 2% and is concentrated on the surface of the sheet or the part in a specific form. Such nickel enrichment provides a barrier to hydrogen penetration and thus slows the diffusion of hydrogen.

More specifically, the steel sheet in publication WO2016016707 has a chemical composition that includes, with contents being expressed by weight: 0.24%≤C≤0.38%, 0.40%≤Mn≤3%, 0.10%≤Si≤0.70%, 0.015%≤Al≤0.070%, 0%≤Cr≤2%, 0.25%≤Ni≤2%, 0.015%≤Ti≤0.10%, 0%≤Nb≤0.060%, 0.0005%≤B≤0.0040%, 0.003%≤N≤0.010%, 0.0001%≤S≤0.005%, 0.0001%≤P≤0.025%, it being understood that the titanium and nitrogen contents satisfy: Ti/N>3.42, and that the carbon, manganese, chromium, and silicon contents satisfy:

$$2.6C + \frac{Mn}{5.3} + \frac{Cr}{13} + \frac{Si}{15} \ge 1.1\%,$$

the chemical composition optionally including one or more of the following elements: 0.05%≤Mo≤0.65%, 0.001%≤W≤0.30%%, 0.0005%≤Ca≤0.005%, the remainder being iron and unavoidable impurities resulting from the processing, the sheet containing a nickel content $Ni_{surf}$ at any point of the steel in the vicinity of the surface of said sheet to a depth $\Delta$, such that: $Ni_{surf} > Ni_{nom}$, with $Ni_{nom}$ denoting the nominal nickel content of steel, and such that, $Ni_{max}$ denoting the maximum nickel content within $$\Delta : \frac{(Ni_{max} + Ni_{nom})}{2} \times (\Delta) \ge 0.6,$$

such that:

$$\frac{(Ni_{max} - Ni_{nom})}{\Delta} \ge 0.01,$$

the depth $\Delta$ being expressed in micrometers, the $Ni_{max}$ and $Ni_{nom}$ contents being expressed in percentages by weight.

In addition, publication WO2016016707 discloses a method for the manufacture of a hot-rolled steel sheet, which includes a step in which the slabs are heated to a temperature between 1250° C. and 1300° C. for a holding time between 20 minutes and 45 minutes. This specific slab heating temperature range and holding time ensures the diffusion of nickel to the interface between the formed oxide layer and the steel substrate, resulting in the appearance of the nickel enriched layer.

Steel parts obtained by using the chemical composition and method disclosed in publication WO2016016707 are particularly suitable, due to their very high strength, for the manufacture of anti-intrusion parts for motor vehicles.

Certain parts or portions of parts of motor vehicle structural components should have a preferential functionality relating to their ability to absorb energy, in particular in the event of impact. This is particularly the case for side rails and lower parts of central pillar reinforcements.

Publication WO2017006159 discloses a steel sheet and an associated manufacturing method that produces a steel sheet having very good ductility characterized by a bending angle greater than 80°.

The resulting parts are suitable for forming particularly impact-resistant structural elements, or parts of motor vehicle structural elements. However, the mechanical strength of the steel sheet in publication WO2017006159 is well below 1800 MPa, which does not satisfy the highest requirements in terms of anti-intrusion properties.

Therefore, some structural elements of motor vehicles having, at the same time, one part wherein the preferential functionality is mechanical strength and another part wherein the preferential functionality is energy absorption, can be produced, for example, by welding together a part obtained according to publication WO2016016707 and a part obtained according to publication WO2017006159.

However, welding requires an additional manufacturing operation for the parts, which increases costs and manufacturing time. In addition, it should be ensured that this welding does not reduce the resistance of the final part in the area around the weld, which requires precise control of welding parameters. There is, therefore, a need to produce in one single piece the structural elements that combine the functionalities of high mechanical strength and high energy absorption capacity.

There is also a need for hot-stamped parts with satisfactory ductility, in other words, with a bending angle of 50° or more.

SUMMARY OF THE INVENTION

It is an object of the present invention to provide a steel sheet with both high mechanical strengths, characterized by tensile strength Rm greater than 1800 MPa, and improved ductility. These two characteristics are a priori difficult to reconcile since it is well known that an increase in mechanical strength generally leads to a decrease in ductility.

Another desirable property for safety parts and structural components of motor vehicles is the reduction of susceptibility to various forms of hydrogen damage, including stress corrosion, in both aqueous and saline environments.

For this reason, the invention also aims to produce a steel sheet with improved resistance to stress corrosion.

The present invention provides that the rolled steel sheet intended to be press hardened is essentially characterized in that its chemical composition includes, the contents being expressed by weight:

$$\text{either } 0.24\% \leq C \leq 0.38\% \text{ and } 0.40\% \leq Mn \leq 3\%, \text{ or}$$

$$0.38 < C \leq 0.43\% \text{ and } 0.05\% \leq Mn < 0.4\%$$

$$0.10\% \leq Si \leq 1.70\%$$

$$0.015\% \leq Al \leq 0.070\%$$

$$0\% \leq Cr \leq 2\%$$

$$0.25\% \leq Ni \leq 2\%$$

$$0.015\% \leq Ti \leq 0.10\%$$

$$0\% \leq Nb \leq 0.060\%$$

$$0.0005\% \leq B \leq 0.0040\%$$

$$0.003\% \leq N \leq 0.010\%$$

$$0.001\% \leq S \leq 0.005\%$$

$$0.0001\% \leq P \leq 0.025\%$$

it being understood that the titanium and nitrogen contents satisfy:

$$Ti/N > 3.42,$$

and the carbon, manganese, chromium, and silicon contents satisfy:

$$2.6C + \frac{Mn}{5.3} + \frac{Cr}{13} + \frac{Si}{15} \geq 1.1\%$$

the chemical composition optionally including one or more of the following elements:

$$0.05\% \leq Mo \leq 0.65\%$$

$$0.001\% \leq W \leq 0.30\%$$

$$0.0005\% \leq Ca \leq 0.005\%$$

the remainder being iron and unavoidable impurities resulting from the processing, said sheet having a nickel content $Ni_{surf}$ at any point of the steel in the vicinity of the surface of said sheet over a depth $\Delta$, such that:

$$Ni_{surf} > Ni_{nom},$$

$Ni_{nom}$ denoting the nominal nickel content of the steel, and such that $Ni_{max}$ denotes the maximum nickel content within $\Delta$:

$$\frac{(Ni_{max} + Ni_{nom})}{2} \times (\Delta) \geq 0.6,$$

and such that:

$$\frac{(Ni_{max} - Ni_{nom})}{\Delta} \geq 0.01$$

the depth $\Delta$ being expressed in micrometers, the $Ni_{max}$ and $Ni_{nom}$ contents being expressed in percentages by weight, and such that the surface density of all the $D_i$ particles and the surface density of the $D_{(>2 \ \mu m)}$ particles larger than 2 micrometers satisfy, at least to a depth of 100 micrometers in the vicinity of the surface of said sheet:

$$D_i + 6.75D_{(>2 \ \mu m)} < 270$$

$D_i$ and $D_{(>2 \ \mu m)}$ being expressed as the number of particles per square millimeter, and said particles denoting all pure or combined oxides, sulfides, nitrides such as oxysulfides and carbonitrides, present in the steel matrix.

The rolled steel sheet of the invention may also have the following optional characteristics considered separately or in all possible technical combinations:

the composition includes, by weight:

$$0.39\% \leq C \leq 0.43\%$$

$$0.09\% \leq Mn \leq 0.11\%$$

the composition includes, by weight:

$$0.95\% \leq Cr \leq 1.05\%$$

the composition includes, by weight:

$$0.48\% \leq Ni \leq 0.52\%.$$

the composition includes, by weight:

$$1.4\% \leq Si \leq 1.70\%$$

the microstructure of the steel sheet is ferritic-perlitic.

the steel sheet is a hot-rolled sheet.

the steel sheet is a cold rolled and annealed sheet.

the steel sheet is precoated with an aluminum or aluminum alloy or aluminum-based metallic layer.

the steel sheet is precoated with a zinc or zinc alloy or zinc-based metallic the steel sheet is precoated with one or more layers of intermetallic alloys containing aluminum and iron, and optionally silicon, the precoating does not contain free aluminum, phase $\tau_5$ of type $Fe_3Si_2Al_{12}$, and phase $\tau_6$ of type $Fe_2Si_2Al_9$.

The invention also relates to a part obtained by press hardening of a steel sheet having a composition according to any of the above-mentioned embodiments of martensitic or martensitic-bainitic structure, having mechanical strength Rm greater than or equal to 1800 MPa, and such that the surface density of all the Di particles and the surface density of the $D_{(>2\ \mu m)}$ particles larger than 2 micrometers satisfy, at least to a depth of 100 micrometers in the vicinity of the surface of said sheet:

$$D_i + 6.75 D_{(>2\ \mu m)} < 270$$

$D_i$ and $D_{(>2\ \mu m)}$ being expressed in number of particles per $mm^2$.

The part according to the invention may also include the following optional characteristics considered individually or in all possible technical combinations:

the part has a bending angle greater than 50° in the direction of rolling.

the manganese, phosphorus, chromium, molybdenum, and silicon contents of the part satisfy:

$$[455 Exp(-0.5[Mn + 25P]) + [390 Cr + 50 Mo] +$$
$$7 Exp(1.3 Si)][6 - 1.22 \times 10^{-9} \sigma_y^3][C_{SCC}] \geq 750$$

yield strength $\sigma_y$ being between 1300 MPa and 1600 MPa, and $C_{SCC}$ being equal to 1 for an uncoated sheet, and equal to 0.7 for a coated sheet.

the manganese, phosphorus, chromium, molybdenum, and silicon contents satisfy:

$$[455 Exp(-0.5[Mn + 25P]) + [390 Cr + 50 Mo] +$$
$$7 Exp(1.3 Si)][6 - 1.22 \times 10^{-9} \sigma_y^3][C_{SCC}] \geq 1100$$

the part contains a nominal nickel content $Ni_{nom}$, characterized in that the nickel content $Ni_{surf}$ in the steel in the vicinity of the surface is greater than $Ni_{nom}$ to a depth $\Delta$, and in that, $Ni_{max}$ denoting the maximum nickel content within $\Delta$:

$$\frac{(Ni_{max} + Ni_{nom})}{2} \times (\Delta) \geq 0.6,$$

and in that:

$$\frac{(Ni_{max} - Ni_{nom})}{\Delta} \geq 0.01$$

the depth $\Delta$ being expressed in micrometers, the $Ni_{max}$ and $Ni_{nom}$ contents being expressed in percentages by weight.

the part is coated with an aluminum or aluminum-based alloy, or a zinc or zinc-based alloy resulting from the diffusion between the steel substrate and the precoating during the heat treatment of press hardening The invention also relates to a method for the manufacture of a hot-rolled steel sheet including the successive steps of:

producing a liquid steel to which manganese, silicon, niobium, and chromium are added, the additions being made in a vacuum chamber, then desulfurizing the liquid metal without increasing its nitrogen content, then, adding titanium, said additions being made in such a way as to obtain a liquid metal of chemical composition as previously defined, then casting a semi-finished product, then heating said semi-finished product to a temperature between 1250° C. and 1300° C. for a holding period at this temperature between 20 minutes and 45 minutes, then hot rolling said semi-finished product to a rolling end temperature TFL between 825° C. and 950° C., to obtain a hot-rolled sheet, then coiling said hot-rolled sheet at a temperature between 500° C. and 750° C. to obtain a hot-rolled and coiled sheet, then pickling the oxide layer formed in the previous steps.

The invention also relates to a method for the manufacture of a hot-rolled, then cold-rolled and annealed steel sheet, specifically including the successive steps of:

supplying a hot-rolled, coiled, and pickled sheet, manufactured by the above-mentioned method then, cold-rolling said hot-rolled, coiled, and pickled hot-rolled sheet to obtain a cold-rolled sheet, then annealing at a temperature between 740° C. and 820° C. said cold-rolled sheet to obtain a cold-rolled and annealed sheet.

The invention also relates to a method for the manufacture of a pre-coated sheet, according to which a rolled sheet manufactured according to any of the two previously defined processes is supplied, then a continuous pre-coating is performed by dipping, said pre-coating being aluminum or an aluminum alloy or aluminum-based alloy, or zinc or a zinc alloy or zinc-based alloy.

The invention also relates to a method for the manufacture of a pre-coated and pre-alloyed sheet, according to which:

a rolled sheet is supplied according to any of the two previously defined processes, then a continuous precoating is performed with a tempered aluminum alloy or aluminum-based alloy, then a heat pre-treatment of said precoated sheet is performed so that the precoating no longer contains free aluminum, phase $\tau_5$ of type $Fe_3Si_2Al_{12}$, and $\tau_6$ of type $Fe_2Si_2Al_9$ The invention also relates to a method for the manufacture of a press-hardened part as previously defined, including the successive steps of:

supplying a sheet manufactured by a method such as those previously defined, then cutting said sheet to obtain a blank, then optionally performing a forming step by cold stamping said blank, then heating said blank to a temperature between 810° C. and 950° C. to obtain a totally austenitic structure in the steel then transferring the blank to a press, then hot stamping said blank to obtain a part, then holding said part within the press to obtain hardening by martensitic transformation of said austenitic structure.

Finally, the invention relates to the use of a press-hardened part as previously described, or manufactured according to the method of manufacture for a hardened part as previously defined, for the manufacture of structural or reinforcement parts for motor vehicles.

BRIEF DESCRIPTION OF THE DRAWINGS

Other characteristics and advantages of the invention will appear during the description below given as an example and made with reference to the following attached figures.

DETAILED DESCRIPTION

Figure 1:
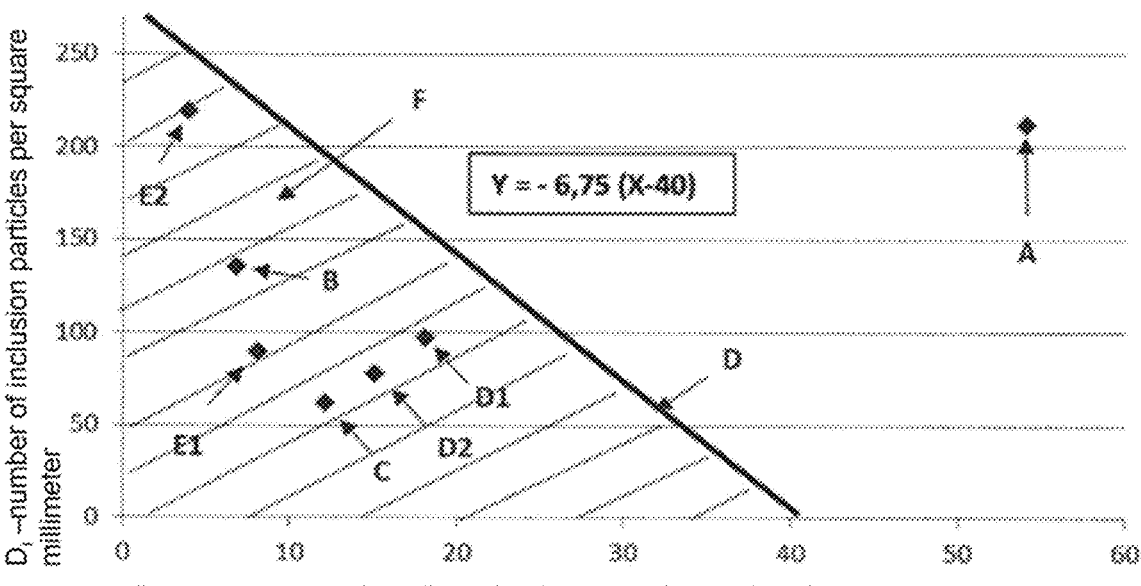
FIG. 1 shows the surface density of all particles as a function of the surface density of medium sized particles larger than 2 micrometers for hot-stamped parts, having a tensile strength greater than 1800 MPa under five test conditions.
Figure 1:

The thickness of the steel sheet used in the inventive method is preferably between 0.5 mm and 4 mm, a thickness range used in particular in the manufacture of structural or reinforcement parts for the automotive industry. This can be obtained by hot rolling or by subsequent cold rolling and annealing. This thickness range is suitable for industrial press hardening tools, particularly hot stamping presses.

Advantageously, steel contains the following elements, the composition being expressed by weight:

a carbon content between 0.24% and 0.38% when the manganese content is between 0.4% and 3%. Carbon plays a major role in quenchability and mechanical strength obtained after cooling following the austenitizing treatment. Below a content of 0.24% by weight, a mechanical strength of 1800 MPa cannot be achieved after hardening by press hardening, without the addition of costly elements. Above a content of 0.38% by weight for a manganese content between 0.4% and 3%, the risk of delayed cracking is increased, and the ductile/fragile transition temperature, measured by using Charpy type notched bending tests, may become above −40° C., which reflects an excessive decrease in toughness. A carbon content between 0.32% and 0.36% by weight results in obtaining the targeted properties in a stable manner, maintaining weldability at a satisfactory level, and limiting production costs. Spot weldability is particularly good when the carbon content is between 0.24% and 0.38%.

an increased carbon content between 0.38% and 0.43% when the manganese content is reduced to between 0.05% and 0.4% to obtain a steel part with increased resistance to stress corrosion. Preferably, the carbon content is between 0.39% and 0.43% for a manganese content between 0.09% and 0.11%. The reduction in manganese content is thus compensated for by the increase in carbon content while giving the steel part a high resistance to stress corrosion.

As discussed below, the carbon content should also be defined in conjunction with manganese, chromium, and silicon contents.

In addition to its role as a deoxidizer, manganese plays a role in quenchability.

it can thus be predicted, when the carbon content is between 0.24% and 0.38%, that the manganese content should be greater than 0.40% by weight to obtain a sufficiently low temperature Ms at the beginning of transformation (austenite→martensite) during press cooling, which serves to increase the resistance Rm. The limitation of the manganese content to 3% results in increased resistance to delayed cracking. Manganese segregates at austenitic grain joints and increases the risk of intergranular failure in the presence of hydrogen. On the other hand, as explained below, resistance to delayed cracking is due in particular to the presence of a nickel-enriched surface layer. Without being bound by a theory, it is thought that when manganese content is excessive, a thick oxide layer can form when the slabs are heated, so that the nickel does not have time to diffuse sufficiently to be located below this layer of iron and manganese oxides.

Alternatively, a decreased manganese content between 0.05% and 0.4% is expected together with an increased carbon content between 0.38% and 0.43%. Decreasing the manganese content results in sheets and parts with improved pitting corrosion resistance and thus improved stress corrosion resistance. The maintenance of high mechanical strength is achieved by significantly increasing the carbon content.

The manganese content is preferably defined in conjunction with the carbon content, and optionally the chromium content:

when the carbon content is between 0.32% and 0.36% by weight, in combination with a Mn content between 0.40% and 0.80% and a chromium content between 0.05% and 1.20%, this results in simultaneous excellent resistance to delayed cracking due to the presence of a particularly effective nickel-enriched surface layer, and very good mechanical cutting properties of the sheets. The Mn content is ideally between 0.50% and 0.70% in order to combine high mechanical strength with resistance to delayed cracking.

when the carbon content is between 0.24% and 0.38%, in combination with a manganese content between 1.50% and 3%, the spot weldability is particularly good.

when the carbon content is between 0.38% and 0.43% in combination with a manganese content between 0.05% and 0.4% and more preferably, between 0.09% and 0.11%, the resistance to corrosion under stress is greatly increased, as will be seen below.

These composition ranges result in a temperature Ms from the beginning of transformation to cooling (austenite-→martensite) between approximately 320° C. and 370° C., which makes it possible to guarantee that the heat-hardened parts have a sufficiently high resistance.

The silicon content of the steel should be between 0.10% and 1.70% by weight: a silicon content greater than 0.10% results in additional hardening and contributes to deoxidation of the liquid steel. The silicon content can be increased to 1.70% while avoiding the presence of excessive surface oxides that could affect the deposition of the coating. However, this increase in silicon content requires pickling operations on the hot-rolled coil and subjecting the sheet to an annealing treatment atmosphere suitable for limiting the formation of oxides.

For a carbon content between 0.24% and 0.38%, the silicon content is preferably above 0.50% in order to avoid softening of the fresh martensite, which can occur when the part is held in the press tool after martensitic transformation.

For a carbon content between 0.38% and 0.43% and a manganese content between 0.05% and 0.4%, the silicon content is preferably between 0.10% and 1.70% for the purpose of reducing the rate of corrosion pitting, which increases the resistance to corrosion under stress.

The silicon content may be increased to 1.70% provided that the other alloying elements present in the steel allow a transformation temperature Ac3 upon heating (ferrite+pearlite→austenite) of less than 880° C. to be achieved, in order to be compatible with common industrial practices for austenitization prior to the hot-pressing step.

In amounts greater than or equal to 0.015%, aluminum is an element that promotes deoxidation in liquid metal during production, and the precipitation of nitrogen. When its content is greater than 0.070%, coarse aluminates may be formed during production, which tend to reduce ductility. Optimally, its content is between 0.020% and 0.060%.

Chromium increases quenchability and contributes to obtaining the mechanical tensile strength Rm at the desired level after press hardening. Beyond a content equal to 2% by weight, the effect of chromium on the homogeneity of mechanical properties in the press-hardened part is saturated. In amounts preferably between 0.05% and 1.20%, this element contributes to increased resistance. For a carbon content between 0.24% and 0.38%, an addition of chromium between 0.30% and 0.50% is preferred to obtain the desired effects on mechanical strength and delayed cracking, while limiting addition costs. When the manganese content is adequate, in other words, between 1.50% and 3% Mn, the addition of chromium is considered optional, the quench-ability obtained through manganese being considered adequate.

Alternatively, for a carbon content between 0.38% and 0.43%, an increased chromium content greater than 0.5% and more preferably between 0.950% and 1.050% is preferred in order to increase pitting corrosion resistance and thus stress corrosion resistance.

In addition to the conditions for each of the elements C, Mn, Cr, Si defined above, these elements are specified jointly according to parameter $$P_1 = 2.6C + \frac{Mn}{5.3} + \frac{Cr}{13} + \frac{Si}{15}$$

As explained in publication WO2016016707, under these conditions, the self-tempered fraction of martensite, under the condition of being held in the press tool, is extremely limited, so that the very high quantity of unannealed martensite results in a high mechanical strength value. When a tensile strength value Rm greater than or equal to 1800 MPa is desired, it has been demonstrated that parameter $P_1 \geq 1.1$.

Titanium has a strong affinity for nitrogen. Taking into account the nitrogen content of the steels of the invention, the titanium content should be greater than or equal to 0.015% in order to obtain effective precipitation. In amounts greater than 0.020% by weight, titanium protects the boron so that this element in its free form has its full effect on quenchability. Its content should be above 3.42N, this quantity being defined by the stoichiometry of TiN precipitation, in order to avoid the presence of free nitrogen. Above 0.10%, however, there is a risk of coarse titanium nitrides being formed in liquid steel, which have a detrimental effect on toughness. The titanium content is preferably between 0.020% and 0.040%, so as to form fine nitrides that limit the growth of austenitic grains when blanks are heated before hot pressing.

In amounts greater than 0.010% by weight, niobium forms niobium carbonitrides, which may also limit the growth of austenitic grains when blanks are heated. However, its content should be limited to 0.060% because of its ability to limit recrystallization during hot rolling, which increases rolling efforts and manufacturing difficulty. Optimal effects are obtained when the niobium content is between 0.030% and 0.050%.

In amounts greater than 0.0005% by weight, boron greatly increases quenchability. By diffusing at the joints of austenitic grains, it exerts a favorable influence by preventing intergranular segregation of phosphorus. Above 0.0040%, this effect is saturated.

A nitrogen content above 0.003% results in the precipitation of TiN, Nb(CN), or (Ti,Nb)(CN) mentioned above in order to limit the growth of the austenitic grain. However, the content should be limited to 0.010% in order to avoid the formation of coarse precipitates.

Optionally, the sheet can contain molybdenum in amounts between 0.05% and 0.65% by weight: this element forms a co-precipitation with niobium and titanium. These precipitates are very heat stable, reinforcing the limitation of the growth of the austenitic grain on heating. An optimal effect is obtained for a molybdenum content between 0.15% and 0.25%.

Optionally, the steel may also contain tungsten in amounts between 0.001% and 0.30% by weight. In the amounts indicated, this element increases hardenability and susceptibility to hardening through the formation of carbides.

Optionally, the steel can also contain calcium in amounts between 0.0005% and 0.005%: by combining with oxygen and sulfur, calcium prevents the formation of large inclusions that are harmful to the ductility of the sheets or the parts thus manufactured.

In excessive amounts, sulfur and phosphorus lead to increased fragility. For this reason, the sulfur content by weight is limited to 0.005% in order to avoid excessive sulfide formation. However, an extremely low sulfur content, in other words, less than 0.001%, is unnecessarily costly to achieve insofar as it does not provide any additional benefit.

For similar reasons, the phosphorus content is between 0.001% and 0.025% by weight. In excessive amounts, this element segregates at austenitic grain joints and increases the risk of delayed cracking due to intergranular fracture.

Nickel is an important element of the invention: indeed, the inventors demonstrated that this element, in amounts between 0.25% and 2% by weight, significantly reduces susceptibility to delayed fracture when it is concentrated on the surface of the sheet or the part in a specific form.

In addition, and as disclosed in publication WO2016016707, the steel part is enriched with nickel near its surface to a maximum of $Ni_{max}$ in two parameters to achieve effective resistance to delayed cracking, A first parameter $P_2$ is defined according to:

$$P_2 = \frac{(Ni_{max} + Ni_{nom})}{2} \times (\Delta)$$

$\Delta$ being the nickel-enriched depth of the steel part and $Ni_{nom}$ being the nominal nickel content of the steel.

This first parameter characterizes the overall nickel content in the enriched layer $\Delta$ The second parameter $P_3$ is defined by:

$$P_3 = \frac{(Ni_{max} - Ni_{nom})}{\Delta}$$

This second parameter characterizes the average nickel concentration gradient, in other words, the intensity of enrichment within the $\Delta$ layer.

By satisfying these two parameters, the steel part has a very high resistance to delayed cracking.

The method for producing a steel sheet according to the invention will now be described: A semi-finished product is cast, in the form of liquid steel, having the composition mentioned above. Unlike a conventional method where the addition of elements occurs during ladle casting from the converter, the inventors demonstrated that it is necessary to perform out this addition without the presence of air, which leads to an increase in the nitrogen content of the liquid metal. In the inventive method, the addition of elements such as manganese, silicon, niobium, chromium is performed in an enclosure where a vacuum atmosphere prevails. After this vacuum treatment, the liquid metal is desulfurized by mixing between the metal and the slag, which is performed under conditions that do not increase the nitrogen content. After checking the nitrogen content in the liquid metal, titanium is added, for example in the form of ferrotitanium. Titanium is thus added at the end of the secondary metallurgy step. Thus, during the addition process, the nitrogen content introduced is reduced and the formation of particles that could adversely affect the ductility of the steel part is limited. By introducing the addition elements in this way, the amount of precipitated particles is reduced at the end of solidification and thus the sheet and the resulting steel part have improved ductility as detailed below.

The semi-finished product obtained after casting can be in the form of a slab typically between 200 mm and 250 mm thick, or a thin slab typically a few tens of millimeters thick, or in any other appropriate form. It is heated to a temperature between 1250° C. and 1300° C. and maintained within this temperature range for a period between 20 minutes and 45 minutes. By reacting with oxygen in the furnace atmosphere, a layer of oxide is formed, for the composition of the steel of the invention, essentially rich in iron and manganese, in which the solubility of the nickel is very low, the nickel remains in metallic form. In parallel with the growth of this oxide layer, nickel is diffused toward the interface between the oxide and the steel substrate, causing a nickel-enriched layer to appear in the steel. At this stage, the thickness of this layer depends in particular on the nominal nickel content of the steel, as well as the temperature and holding conditions defined above.

During the subsequent manufacturing cycle, this enriched initial layer is simultaneously subjected to:

a decrease in thickness, due to the reduction rates conferred by the successive rolling steps, an increase in thickness due to the exposure of the sheet to high temperature during the successive manufacturing stages. However, this increase occurs to a lesser extent than during the slab heating stage.

A manufacturing cycle for hot-rolled sheet typically includes:

hot rolling steps (roughing, finishing) in a temperature range from 1250° C. to 825° C., a coiling step in a temperature range from 500° C. to 750° C.

The inventors demonstrated that a variation in the hot rolling and coiling parameters, in the ranges defined by the invention, did not significantly alter the mechanical characteristics, so that the method is tolerant to a certain variation within these ranges, with no significant impact on the resulting products.

At this stage, the hot-rolled sheet, which can typically be 1.5 mm-4.5 mm thick, is pickled by a method known per se, which only removes the oxide layer, so that the nickel-enriched layer is located in the vicinity of the sheet's surface.

When a thinner sheet is required, cold rolling is performed with an appropriate reduction rate, for example between 30% and 70%, followed by annealing at a temperature typically between 740° C. and 820° C. in order to recrystallize the hardened metal. After this heat treatment, the sheet can be cooled so as to obtain an uncoated sheet, or continuously coated by passing through a quenching bath, according to methods known per se, and finally cooled.

As explained in publication WO2016016707, the step that has the primary influence on the characteristics of the nickel-enriched layer on the final sheet is the slab-heating step, within a specific temperature range and holding time. Conversely, the annealing cycle of the cold-rolled sheet, with or without a coating step, has only a secondary influence on the characteristics of the nickel-enriched surface layer. In other words, with the exception of the rate of reduction in cold rolling which reduces the thickness of the nickel-enriched layer by a homothetic amount, the characteristics of nickel enrichment of this layer are nearly identical on a hot-rolled sheet and on a sheet which has also undergone cold rolling and annealing, whether or not it includes a pre-coating step.

This precoating can be aluminum, an aluminum alloy (having more than 50% aluminum) or an aluminum-based alloy (wherein aluminum is the major element) This precoating is advantageously an aluminum-silicon alloy including by weight 7%-15% silicon, 2% to 4% iron, optionally between 15 ppm and 30 ppm calcium, the remainder being aluminum and unavoidable impurities resulting from the processing.

The precoating can also be an aluminum alloy containing 40%-45% Zn, 3%-10% Fe, 1%-3% Si, the remainder being aluminum and unavoidable impurities resulting from the processing.

According to a variant, the precoating may be an aluminum alloy coating, which is in the form of intermetallics containing iron. This type of precoating is obtained by performing a heat pre-treatment of the precoated aluminum or aluminum alloy sheet. This heat pre-treatment is performed at a temperature $\theta_1$ for a holding time $t_1$, so that the precoating no longer contains free aluminum, phase $\tau_5$ of type $Fe_3Si_2Al_{12}$, and of type $\tau_6$ $Fe_2Si_2Al_9$. This type of precoating then allows the blanks to be heated before the hot stamping stage at a much faster rate, which minimizes the time required to maintain the blanks at high temperature during heating, in other words, to reduce the amount of hydrogen adsorbed during this blank heating stage.

Alternatively, the precoating can be galvanized, or galvanized-alloyed, in other words, with an amount of iron between 7% and 12% after heat treatment of the alloy performed under industrial conditions immediately after the galvanizing bath.

The precoating can also be composed of an overlay of layers deposited in successive stages, at least one of which can be aluminum or an aluminum alloy.

After the production described above, the sheets are cut or punched by methods known per se, in order to obtain blanks whose geometry is related to the final geometry of the stamped and hardened-pressed part. As explained above, cutting sheets containing in particular between 0.32% and 0.36% C, between 0.40% and 0.80% Mn, between 0.05% and 1.20% Cr, is particularly easy due to the low mechanical strength at this stage, associated with a preferably ferritic-perlitic, or ferritic-perlitic microstructure [sic].

These blanks are heated to a temperature between 810° C. and 950° C. to completely austenitize the steel substrate, hot-stamped then held in the press tool to obtain a martensitic transformation. The deformation rate applied during the hot stamping stage may be more or less important depending on whether or not a cold forming step (stamping) was performed prior to the austenitizing treatment. The inventors demonstrated that the thermal heating cycles for press hardening, which involve heating the blanks in the vicinity of the transformation temperature Ac3, then maintaining them at this temperature for a few minutes, also do not cause any significant change in the nickel-enriched layer.

In other words, the characteristics of the nickel-enriched surface layer are similar, on the sheet before press hardening, and on the part after press hardening, obtained from this sheet.

By means of compositions of the invention, which have a lower transformation temperature Ac3 than conventional steel compositions, it is possible to austenitize blanks with reduced temperatures and holding times, thus reducing the possible adsorption of hydrogen in heating furnaces.

The inventors discovered that in order to obtain a steel part with improved ductility, in addition to the advantageous properties of mechanical strength and delayed cracking resistance explained above, the density of particles present in the vicinity of the sheet surface should satisfy specific conditions. In the context of the invention, these particles denote all oxides, sulfides, nitrides, pure or combined, such as oxysulfides and carbonitrides, present in the steel matrix. It has been shown that some particles are sites of early damage that reduces bendability. In the context of the invention, surface proximity refers to the area between the surface of the sheets and 100 micrometers below it.

In particular, the density of particles and especially that of medium sized particles larger than 2 micrometers should satisfy certain criteria.

Figure 2:
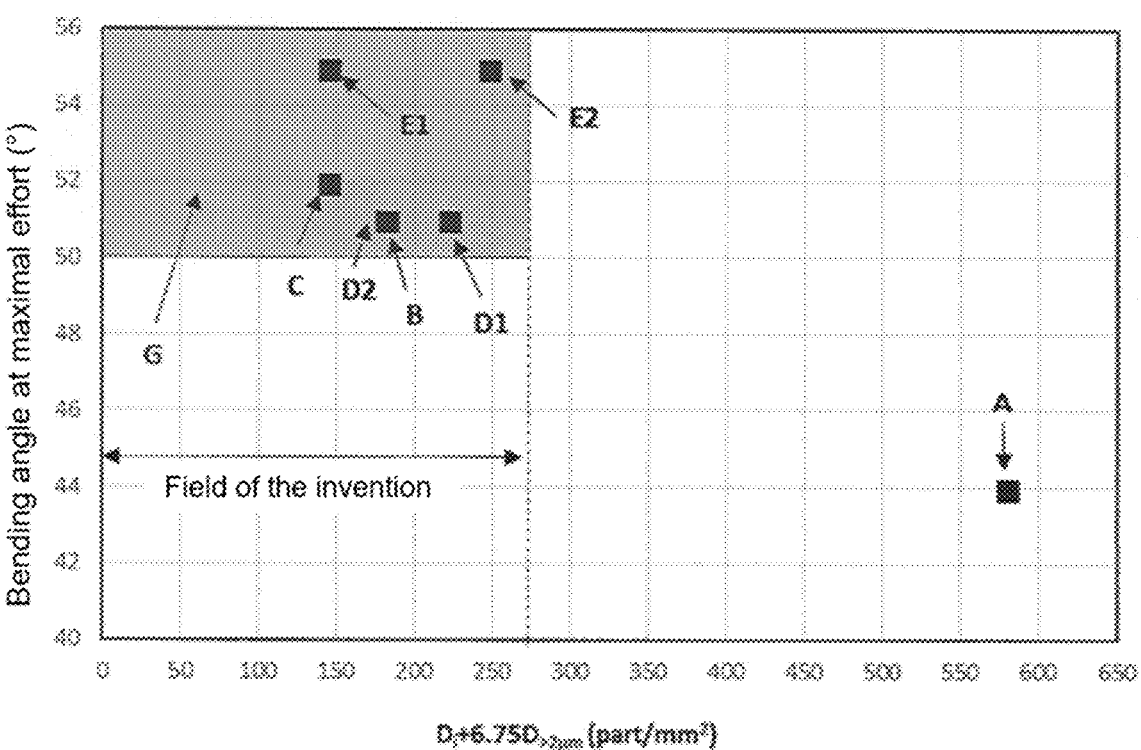
FIG. 2 shows the bending angle of hot-stamped parts having a tensile strength greater than 1800 MPa, as a function of a parameter quantifying the density of particles present in hot-stamped parts. This parameter depends on the surface density of all particles, as well as the density of medium sized particles greater than 2 micrometers; these have been evaluated for the same five test conditions.

Tables 1 and 2 below as well as FIGS. 1 and 2 show the tests and measurements resulting in the establishment of a parameter based on particle densities.

Five steel sheets A, B, C, D, E, whose respective chemical compositions are given in Table 1, were produced. The compositions are expressed in percentages by weight, the remainder of the composition being iron and impurities resulting from the processing.

These sheets were obtained from steel produced in the liquid state by various methods: for test A (reference test), the addition elements (manganese, silicon, chromium, and niobium) were added under air, during ladle casting from the converter.

For tests B, C, D, E, performed under the conditions of the invention, these addition elements were added during an RH (Ruhrstahl Heraeus) treatment in the RH tank maintained under vacuum. The subsequent desulfurization treatment was performed without nitrogen recovery in the liquid steel. Titanium was added as ferrotitanium at the end of the secondary metallurgical process After casting in the form of semi-finished products, slabs of these various steels were heated to a temperature of 1275° C. and kept at this temperature for 45 minutes. They were then rolled with a rolling end temperature of 950° C., and coiled at a temperature of 650° C. After pickling, the sheets were cold rolled to a thickness of 1.5 mm. The sheets were then annealed by alumination at a temperature of 760° C., then continuously aluminized by dipping in a bath containing 9% by weight silicon and 3% by weight iron, the remainder being aluminum and unavoidable impurities.

The cut sheets were hot stamped, after heating to a temperature of 900° C. and a total holding time in the furnace of 6 minutes 30 seconds.

TABLE 1

| Steel composition for tests A, B, C, D and E | | | | | | |
|---|---|---|---|---|---|---|
| Reference test | C | Mn | Si | Ni | Cr | Mo | Al |
| A | 0.34 | 0.61 | 0.54 | 0.42 | 0.35 | 0.20 | 0.032 |
| B | 0.345 | 0.61 | 0.53 | 0.39 | 0.35 | 0.19 | 0.043 |
| C | 0.33 | 0.60 | 0.53 | 0.38 | 0.33 | 0.17 | 0.028 |
| D | 0.33 | 0.66 | 0.55 | 0.40 | 0.35 | 0.19 | 0.036 |
| E | 0.33 | 0.65 | 0.55 | 0.44 | 0.35 | 0.20 | 0.038 |

| Reference test | Nb | Ti | P | S | N | B |
|---|---|---|---|---|---|---|
| A | 0.038 | 0.034 | 0.008 | 0.0004 | 0.0055 | 0.0039 |
| B | 0.039 | 0.033 | 0.004 | 0.0015 | 0.0051 | 0.0029 |
| C | 0.045 | 0.017 | 0.012 | 0.0003 | 0.0044 | 0.0032 |
| D | 0.048 | 0.017 | 0.011 | 0.0004 | 0.0051 | 0.0024 |
| E | 0.052 | 0.015 | 0.010 | 0.0005 | 0.0035 | 0.0029 |

After press hardening, measurements were made on three samples by scanning electron microscopy to visualize particles larger than 0.5 micrometers in size over a surface area of 6 mm$^2$ and to a depth of 100 micrometers in the vicinity of the part surface A first type of measurement consists in evaluating the density $D_i$ of all particles, namely oxides, sulfides, nitrides, pure or combined, such as oxysulfides and carbonitrides, present in the steel matrix. A second type of measurement consists in evaluating the density $D_{(>2 \ \mu m)}$ of these same particles whose size is greater than 2 micrometers. In Table 2 below, reference tests D1, D2, E1 and E2 correspond respectively to steel sheets of composition D and E as shown in Table 1 below from two different steel coils.

The bending angle was determined on 60×60 mm$^2$ hardened parts supported by two rollers, according to bending standard VDA-238. The bending force is exerted by a punch with a radius of 0.4 mm. The spacing between the rollers and the punch is equal to the thickness of the parts tested, with a clearance of 0.5 mm being added. The appearance of a crack is detected as it coincides with a decrease in load in the load displacement curve. Tests are discontinued when the load decreases more than 30 N from its maximum value. The bending angle of each reference test is measured at maximum load. The results shown in Table 2 below correspond to the seven samples collected in the direction of rolling. We then obtained an average bending angle value.

TABLE 2

Particle density (Di) and density of average-size particles greater than 2 micrometers ($D_{(>2 \, \mu m)}$) over a depth of 100 micrometers in the vicinity of the sheet surface, and corresponding bending angle.

| Reference test | $D(>2 \, \mu m)$ (particles/mm2) | $D_i$ (particles/mm2) | Bending angle (°) |
|---|---|---|---|
| A | 54 | 212.5 | 44 |
| B | 6.7 | 136 | 50.85 |
| C | 12 | 62.5 | 52 |
| D1 | 18 | 98 | 51 |
| D2 | 15 | 78.5 | 51 |
| E1 | 8 | 90.5 | 55 |
| E2 | 3.8 | 220 | 55 |

Values underlined: not in accordance with the invention

To fulfill the industrial requirements for ductility in the event of impact, the satisfactory parts in terms of tensile strength are those with a bending angle greater than 50°. The hot-stamped part under the conditions of reference test A, where a conventional method was used for additions of elements, has a bending angle of less than 50°.

Figure 3:
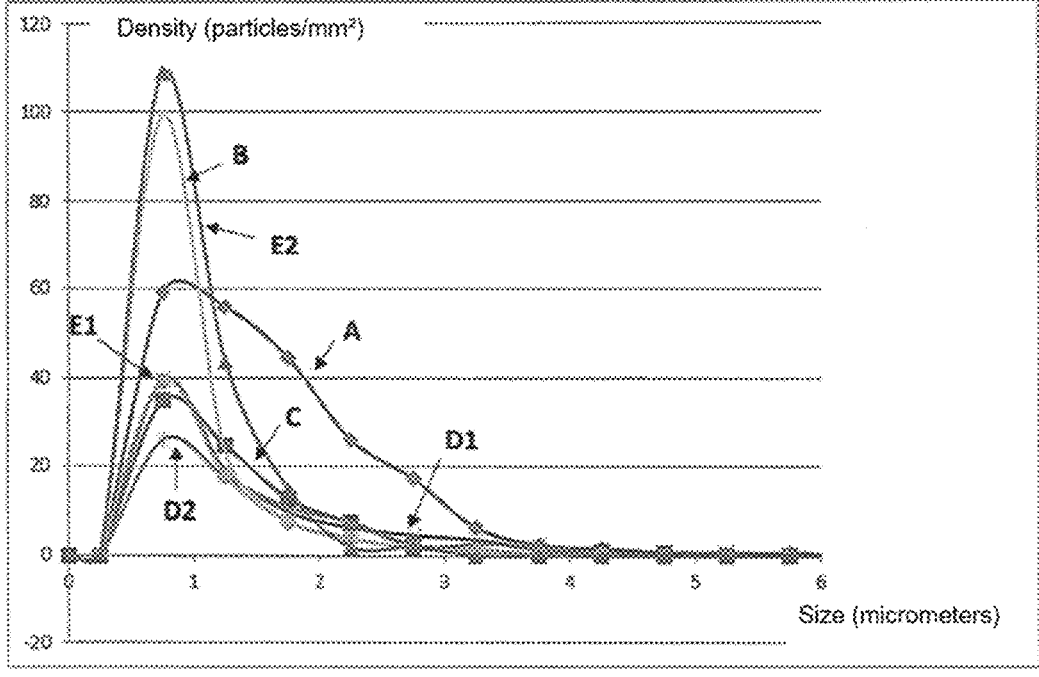
FIG. 3 shows the surface density of particles as a function of particle size for the five test conditions.

FIG. 3 illustrates the distribution of particles by average particle size and density for the seven reference tests in Table 2. It can be seen that reference test A has a distribution of particle density according to particle size that is substantially different from that of the other reference tests. Primarily, the density of the average particle size less than 2 micrometers of reference A is significantly lower than that of the other reference tests. The processing conditions according to the invention make it possible to obtain a significant reduction in all particles, and in particular particles larger than 2 micrometers in size. This favorable distribution can be seen on the sheet as well as on the hot-stamped part produced from this sheet.

For each reference test in Table 2, the density $D_{(>2 \, \mu m)}$ for medium sized particles larger than 2 micrometers and the density $D_i$ for all particles were plotted on FIG. 1. Considering that only reference A does not satisfy the desired criterion of a bending angle greater than 50°, there is a relationship between density $D_i$ and density $D_{(>2 \, \mu m)}$ which is obtained based on line D of the equation:

$$Y = -6.75(X - 40)$$

Considering that the parts likely to have a bending angle greater than 50° are located under line D in hatched area F, it follows that the criterion for satisfying good bending ductility is as follows:

$$D_i + 6.75 D_{(>2 \, \mu m)} < 270$$

$D_i$ and $D_{(>2 \, \mu m)}$ both being expressed in number of particles per mm².

This criterion demonstrates the significant influence of medium-sized particles larger than 2 micrometers on the ductility of hot-stamped parts.

In Table 3 below and FIG. 2, the defined criterion $D_i+6.75$ $D_{(>2 \, \mu m)}$ and the bending angle obtained for the seven test conditions A, B, C, D1, D2, E1, and E2 are shown. The grey area G in FIG. 2 defines the area, according to the invention, for which the part has a bending angle greater than 50° and in which the criterion is less than 270. In this area G, the part has improved ductility and a mechanical strength Rm greater than 1800 MPa.

TABLE 3

Criterion $D_i + 6.75 \, D_{(>2 \, \mu m)}$ and corresponding bending angle

| Reference test | Criterion $D_i + 6.75 \, D_{(>2 \, \mu m)}$ | Bending angle (°) |
|---|---|---|
| A | 577 | 44 |
| B | 181 | 50.85 |
| C | 143 | 52 |
| D1 | 220 | 51 |
| D2 | 180 | 51 |
| E1 | 144 | 55 |
| E2 | 246 | 55 |

Values underlined: not in accordance with the invention

The inventors also discovered that the decrease in manganese content accompanied by a significant increase in carbon content made it possible to substantially increase the stress corrosion resistance of the steel part while maintaining a high mechanical strength of over 1800 MPa.

Measuring susceptibility to stress corrosion is known to be performed by methods using a four-point constant load bending test by:

immersion of the steel part stressed by this method in a saline solution at room temperature for 30 days, or spraying a saline solution at 35° C. for 4 hours on the stressed steel part, with this operation being repeated over a period of 20 days.

However, these methods do not sufficiently reproduce the environmental conditions in which steel parts are likely to be found.

For this reason, another so-called cyclical method provides for alternation of the saline phase, the wet phase, and the dry phase. The saline phase is applied for 2% of the test period for a percentage by weight of NaCl in the atmosphere of 1% at pH 4. The subsequent wet phase is applied for 28% of the test period, at a relative humidity percentage of 90% at a temperature of 35° C. The final dry phase is applied for 70% of the test period, at a relative humidity percentage of 55% and a temperature of 35° C. This cyclical test is applied for 42 days.

However, this cyclic method is not sufficiently severe to ensure that the steel part has satisfactory stress corrosion resistance for the intended applications. A new cyclical method called VDA (Verband der AutomobilIndustrie) was therefore applied in which the stressed steel part is subjected to more severe corrosion conditions. A test period, or cycle, is one week.

In this VDA method, the saline phase is applied for 5% of the test period (instead of 2% for the cyclic method) for a percentage by weight of NaCl in the atmosphere of 1% at pH 7. The subsequent wet phase is applied for 25% of the test period, at a relative humidity percentage of 95% (instead of 90% for the cyclic method) at a temperature of 35° C. The final dry phase is applied for 65% of the test period, at a relative humidity percentage of 70% (instead of 55% for the cyclic method) and at a temperature of 35° C. The VDA method is applied for 6 cycles, in other words, 6 weeks or 42 days.

According to the invention, a steel part is considered to satisfy the stress corrosion criterion if no material failure occurs for at least 42 days.

Four test conditions H, I, J, and K were considered, wherein the chemical compositions are given in Table 4 below. The compositions are expressed as a percentage by weight, the remainder of the composition being iron and impurities resulting from the processing.

The four test conditions H, I, J, and K satisfy the criteria defined above for particle density and surface nickel enrichment.

TABLE 4

| Steel composition for four test conditions H, I, J, and K | | | | | | | |
|---|---|---|---|---|---|---|---|
| Reference test | C | Mn | S | P | Si | Cr | Nb |
| H | 0.35 | 0.60 | 0.0003 | 0.012 | 0.53 | 0.33 | 0.045 |
| I | 0.35 | 0.62 | 0.0003 | 0.013 | 0.57 | 0.51 | 0.039 |
| J | 0.40 | 0.10 | 0.0001 | 0.012 | 0.21 | 1.00 | 0.041 |
| K | 0.33 | 0.48 | 0.0001 | 0.012 | 1.53 | 0.96 | 0.047 |

| Reference test | Al | Ti | Ni | Mo | B(ppm) | N |
|---|---|---|---|---|---|---|
| H | 0.045 | 0.017 | 0.38 | 0.17 | 32 | 0.004 |
| I | 0.030 | 0.020 | 0.40 | 0.20 | 24 | 0.005 |
| J | 0.023 | 0.015 | 0.50 | 0.24 | 19 | 0.003 |
| K | 0.016 | 0.020 | 0.39 | 0.19 | 33 | 0.004 |

The sheet manufactured under condition H has a temperature Ac3 of 829° C. This temperature is evaluated by the Andrews formula, known per se. The sheet manufactured under test condition I has a temperature Ac3 calculated by the Andrews formula of 820° C., the sheet manufactured under test condition J has a temperature Ac3 calculated by the Andrews formula of 807° C., and the sheet manufactured under test condition K has a temperature Ac3 calculated by the Andrews formula of 871° C.

Reference test J thus has an austenitizing temperature that is particularly favorable for its production in the industrial setting.

The Ms temperatures (martensitic transformation start temperature during cooling) calculated from the Andrews formula, are 362° C., 345° C., 353° C., and 348° C. for sheets manufactured under conditions H, I, J, and K respectively.

The steel sheets of reference tests H, I, J, and K were produced under the following conditions:
heating to a temperature of 1275° C. for 30 minutes
hot rolling to a rolling end temperature TFL of 900° C.
coiling at 540° C. for reference test H, 550° C. for reference tests I and J, and 580° C. for reference test K,
cold rolling with a reduction rate of 58%,
annealing at a temperature of 760° C. so as to obtain recrystallization of the hardened metal, and
cooling.

In reference test H, the sheet is coated with an AlSi alloy as mentioned above, the sheets manufactured under conditions I, J, and K are not coated.

The result is a steel sheet having a thickness of 1.5 millimeters for conditions H, I, and K and 1.3 millimeters for condition J.

After the sheet is cut to obtain a blank, it is heated in a furnace at 900° C. for 6 minutes 30 seconds (total holding time in the furnace), so that a total austenitic transformation occurs in the steel, then the blank is rapidly transferred to a device that simulates hot pressing. The transfer is completed in under 10 seconds, so that no transformation of the austenite occurs during this step. The pressure exerted by the press tool is 5000 MPa. The part is held in the press to obtain hardening by martensitic transformation of the austenitic structure. A heat treatment of 170° C. is then applied to the sheet for 20 minutes, corresponding to a firing cycle for paint applied to the hot-stamped part.

Mechanical tensile properties (yield strength øy and mechanical strength Rm) measured on stamped parts H, I, J, and K are shown in Table 5 below.

TABLE 5

| Measured mechanical tensile properties under the four test conditions H, I, J, and K | | |
|---|---|---|
| Reference test | $\sigma_Y$ (MPa) | Rm (MPa) |
| H | 1482 | 1845 |
| I | 1587 | 1996 |
| J | 1599 | 1923 |
| K | 1497 | 1824 |

Three specimens from hot-stamped parts for each of the reference tests H, I, J, and K were subjected to the VDA stress corrosion test described above. The bending stress applied to the specimen on the outer surface between the two rollers is 750 MPa.

The results are shown in Table 6 below.

TABLE 6

| Results of stress corrosion tests using the VDA method for test conditions H-K | | | | | | |
|---|---|---|---|---|---|---|
| | | | Fracture | | | |
| Reference Test | Cycle 1 | Cycle 2 | Cycle 3 | Cycle 4 | Cycle 5 | Cycle 6 |
| H | 0 | 2 | 1 | — | — | — |
| I | 0 | 0 | 1 | 2 | — | — |
| J | 0 | 0 | 0 | 0 | 0 | 0 |
| K | 0 | 0 | 0 | 0 | 0 | 0 |

It can be seen that for test condition H, two parts were fractured during the $2^{nd}$ cycle, and the third part was fractured during the $3^{rd}$ cycle.

For reference test I, a first part fractured during the $3^{rd}$ cycle, and the other two parts fractured during the $4^{th}$ cycle.

For reference tests J and K, no parts fractured at the end of the $6^{th}$ cycle. Reference test J with a low manganese content and reference test K with a high silicon content thus offer excellent resistance to corrosion under stress.

Without being bound by a theory, the inventors defined the expression of a criterion to ensure, for a hot-stamped part with a yield strength between 1300 MPa and 1600 MPa, a corrosion resistance under stress sufficient to pass the VDA test.

This criterion depends on three parameters: a parameter P1 depending on the composition of the part, a parameter P2 depending on the stress applied. and a parameter P3 depending on the optional presence of a coating on the hot-stamped part.

Parameter P1 is expressed as follows as a function of manganese, phosphorus, chromium, molybdenum, and silicon contents:

P1=455Exp(−0.5[Mn+25P])+[390Cr+50Mo]+7Exp(1.3Si), the contents being expressed as percentages by weight.

Parameter P2 is expressed as follows:

$$P2 = [6 - 1.22 \times 10^{-9} \sigma y^3]$$

where $\sigma_y$ denotes the yield strength, expressed in MPa, and is between 1300 MPa and 1600 MPa.

Parameter P3 is quantified by a parameter $C_{SCC}$ whose value is equal to 1 if the uncoated part is bare, and equal to 0.7 if the part is coated The stress corrosion failure threshold Xo is thus defined as: Xo=P1×P2×P3

The stress corrosion failure thresholds Xo thus determined for stamped parts H, I, J, and K are shown in Table 7 below.

TABLE 7

| Stress corrosion failure thresholds Xo for the four reference tests H, I, J and K | |
|---|---|
| Reference test | Xo |
| H | 627 |
| I | 570 |
| J | 793 |
| K | 1417 |

The inventors thus demonstrated that if Xo is greater than or equal to 750, and preferably greater than or equal to 790, the corresponding sheet or part passes the VDA stress corrosion resistance test.

The following criterion is then defined which, if satisfied, ensures good resistance to stress corrosion of the steel sheet and part:

$$[455Exp(-0.5[Mn + 25P]) + [390Cr + 50Mo] +$$
$$7Exp(1.3Si)][6 - 1.22 \times 10^{-9}\sigma_y^3][C_{SCC}] \geq 750$$

Preferably, the value of Xo is greater than or equal to 790, and very preferably greater than 1100 to obtain a very high resistance to stress corrosion.

In addition to the evidence that decreasing Mn content makes it possible to increase stress corrosion resistance, it can be seen that increasing chromium content (0.33% for reference test H, 0.51% for reference I and around 1% for references J and K) also improves the stress corrosion resistance of the part. Reference tests K also demonstrate that a silicon content of 1.53% results in high resistance to stress corrosion.

Thus, the invention provides a method for the manufacture of press-hardened parts simultaneously offering high mechanical tensile properties, good toughness, and high resistance to stress corrosion. These parts will be advantageously used as structural or reinforcement parts in the automotive industry.

What is claimed is:

1. A method for manufacture of a hot-rolled steel sheet, the method comprising successive steps of:
producing a liquid steel to which manganese, silicon, niobium, and chromium are added, the additions being made in a vacuum chamber, then
desulfurizing the liquid steel with the additions without increasing its nitrogen content, then
adding titanium, said additions being made so as to obtain a liquid metal having a chemical composition comprising, with contents being expressed by weight:

either 0.24% ≤ C ≤ 0.38% and 0.40% ≤ Mn ≤ 3%, or 0.38% < C ≤ 0.43% and 0.05% ≤ Mn < 0.4%

0.10% ≤ Si ≤ 1.70%

0.015% ≤ Al ≤ 0.070%

0% ≤ Cr ≤ 2%

0.25% ≤ Ni ≤ 2%

0.015% ≤ Ti ≤ 0.10%

0% ≤ Nb ≤ 0.060%

0.0005% ≤ B ≤ 0.0040%

0.003% ≤ N ≤ 0.010%

0.0001% ≤ S ≤ 0.005%

0.0001% ≤ P ≤ 0.025% the titanium and nitrogen contents satisfying:

Ti/N > 3.42, and the carbon, manganese, chromium, and silicon contents satisfying:

$$2.6C + \frac{Mn}{5.3} + \frac{Cr}{13} + \frac{Si}{15} \geq 1.1\%$$

the chemical composition optionally including one or more of the following elements:

0.05% ≤ Mo ≤ 0.65%

0.001% ≤ W ≤ 0.30%

0.0005% ≤ Ca ≤ 0.005% a remainder being iron and unavoidable impurities resulting from processing, then
casting a semi-finished product, then
heating said semi-finished product to a temperature between 1250° C. and 1300° C. for a holding period at this temperature between 20 minutes and 45 minutes, then
hot rolling said semi-finished product to a rolling end temperature TFL between 825° C. and 950° C., to obtain a hot-rolled sheet, then
coiling said hot-rolled sheet at a temperature between 500° C. and 750° C. to obtain a hot-rolled and coiled sheet, then pickling an oxide layer formed in the previous steps,
wherein, the surface density of all the particles $D_i$ and the
surface density of the particles larger than 2 microm-
eters $D_{(>2\ \mu m)}$ satisfy, at least to a depth of 100 microm-
eters in the vicinity of the surface of said hot rolled
sheet:

$$D_i + 6.75 D_{(>2\ \mu m)} < 270$$

$D_i$ and $D_{(>2\ \mu m)}$ being expressed as the number of particles
per square millimeter, and said particles denoting all
oxides, sulfides, nitrides, pure or combined such as
oxysulfides and carbonitrides, present in the steel of the
hot rolled steel sheet.

2. The method as recited in claim 1 wherein the chemical
composition includes, by weight:

$$0.39\% \leq C \leq 0.43\%$$

$$0.09\% \leq Mn \leq 0.11\%.$$

3. The method as recited in claim 2 wherein the chemical
composition includes, by weight:

$$0.95\% \leq Cr \leq 1.05\%.$$

4. The method as recited in claim 2 wherein the chemical
composition includes, by weight:

$$0.48\% \leq Ni \leq 0.52\%.$$

5. The method as recited in claim 2 wherein the chemical
composition includes, by weight:

$$1.4\% \leq Si \leq 1.70\%.$$

6. The method as recited in claim 1 wherein the chemical
composition includes, by weight:

$$0.95\% \leq Cr \leq 1.05\%.$$

7. A method for the manufacture of a cold-rolled and
annealed sheet, the method comprising successive steps of:
supplying the hot-rolled, coiled, and pickled sheet, manu-
factured by the process as recited in claim 1,
cold rolling said hot-rolled, coiled, and pickled hot-rolled
sheet to obtain a cold-rolled sheet, then
annealing said cold-rolled sheet at a temperature between
740° C. and 820° C. to obtain a cold-rolled and
annealed sheet.

8. A method for the manufacture of a pre-coated sheet, the
method comprising:
supplying the hot-rolled, coiled, and pickled sheet, manu-
factured by the process as recited in claim 1, then,
performing a continuous pre-coating by dipping, said
pre-coating being aluminum or an aluminum alloy or
aluminum-based alloy, or zinc or a zinc alloy or zinc-
based alloy.

9. A method for the manufacture of a pre-coated and
pre-alloyed sheet, the method comprising:
supplying the sheet as recited in claim 8,
performing a continuous precoating with a tempered
aluminum alloy or aluminum-based alloy, then
performing a heat pre-treatment of said precoated sheet so
that the precoating no longer contains free aluminum,
phase $\tau_5$ of type $Fe_3Si_2Al_{12}$, and phase $\tau_6$ of type
$Fe_2Si_2Al_9$.

10. A method for the manufacture of a pre-coated and
pre-alloyed sheet, the method comprising:
supplying the sheet as recited in claim 7,
performing a continuous precoating with a tempered
aluminum alloy or aluminum-based alloy, then
performing a heat pre-treatment of said precoated sheet so
that the precoating no longer contains free aluminum,
phase $\tau_5$ of type $Fe_3Si_2Al_{12}$, and phase $\tau_6$ of type
$Fe_2Si_2Al_9$.

11. A method for manufacture of a hot-rolled steel sheet,
the method comprising successive steps of:
producing a liquid steel to which manganese, silicon,
niobium, and chromium are added, the additions being
made in a vacuum chamber, then
desulfurizing the liquid steel with the additions without
increasing its nitrogen content, then
adding titanium, said additions being made so as to obtain
a liquid metal having a chemical composition compris-
ing, with contents being expressed by weight:

$$0.39\% \leq C \leq 0.43\%,$$

$$0.09\% \leq Mn \leq 0.11\%$$

$$0.10\% \leq Si \leq 1.70\%$$

$$0.015\% \leq Al \leq 0.070\%$$

$$0\% \leq Cr \leq 2\%$$

$$0.25\% \leq Ni \leq 2\%$$

$$0.015\% \leq Ti \leq 0.10\%$$

$$0\% \leq Nb \leq 0.060\%$$

$$0.0005\% \leq B \leq 0.0040\%$$

$$0.003\% \leq N \leq 0.010\%$$

$$0.0001\% \leq S \leq 0.005\%$$

$$0.0001\% \leq P \leq 0.025\%$$

the titanium and nitrogen contents satisfying:

$$Ti/N > 3.42,$$

and the carbon, manganese, chromium, and silicon
contents satisfying:

$$2.6C + \frac{Mn}{5.3} + \frac{Cr}{13} + \frac{Si}{15} \geq 1.1\%$$

the chemical composition optionally including one or
more of the following elements:

$$0.05\% \leq Mo \leq 0.65\%$$

$$0.001\% \leq W \leq 0.30\%$$

$$0.0005\% \leq Ca \leq 0.005\%$$

a remainder being iron and unavoidable impurities resulting from processing, then casting a semi-finished product, then heating said semi-finished product to a temperature between 1250° C. and 1300° C. for a holding period at this temperature between 20 minutes and 45 minutes, then hot rolling said semi-finished product to a rolling end temperature TFL between 825° C. and 950° C., to obtain a hot-rolled sheet, then coiling said hot-rolled sheet at a temperature between 500° C. and 750° C. to obtain a hot-rolled and coiled sheet, then pickling an oxide layer formed in the previous steps.

12. The method as recited in claim 11 wherein the chemical composition includes, by weight:

$$1.4\% \leq Si \leq 1.70\%.$$

13. The method as recited in claim 11 wherein the chemical composition includes, by weight:

$$0.95\% \leq Cr \leq 1.05\%.$$

14. The method as recited in claim 11 wherein the chemical composition includes, by weight:

$$0.48\% \leq Ni \leq 0.52\%.$$

* * * * *